United States Patent
Yoon et al.

(10) Patent No.: US 9,850,408 B2
(45) Date of Patent: Dec. 26, 2017

(54) OPTICAL ADHESIVE FILM HAVING EXCELLENT PEELING EFFECT AT HIGH TEMPERATURES

(71) Applicant: LG Chem, Ltd., Seoul (KR)

(72) Inventors: Chan Oh Yoon, Cheongju-si (KR); Jang Soon Kim, Seongnam-si (KR); Min Seok Song, Anyang-si (KR); Eun Kyung Park, Seoul (KR); Bu Gi Jung, Anyang-si (KR)

(73) Assignee: LG Chem, Ltd. (KR)

( * ) Notice: Subject to any disclaimer, the term of this patent is extended or adjusted under 35 U.S.C. 154(b) by 186 days.

(21) Appl. No.: 14/406,314

(22) PCT Filed: Jan. 8, 2013

(86) PCT No.: PCT/KR2013/000112
§ 371 (c)(1),
(2) Date: Dec. 8, 2014

(87) PCT Pub. No.: WO2013/187571
PCT Pub. Date: Dec. 19, 2013

(65) Prior Publication Data
US 2015/0125675 A1 May 7, 2015

(30) Foreign Application Priority Data
Jun. 13, 2012 (KR) ........................ 10-2012-0063064

(51) Int. Cl.
*B32B 7/12* (2006.01)
*C09J 133/08* (2006.01)
(Continued)

(52) U.S. Cl.
CPC .............. *C09J 133/08* (2013.01); *C09J 7/00* (2013.01); *C09J 7/0225* (2013.01); *C09J 133/04* (2013.01);
(Continued)

(58) Field of Classification Search
CPC .......... C09J 133/04; C09J 7/0225; C08L 33/08
See application file for complete search history.

(56) References Cited

U.S. PATENT DOCUMENTS

2005/0272949 A1* 12/2005 Olson .................... C07C 327/22
560/80

FOREIGN PATENT DOCUMENTS

| CN | 1611542 A | 5/2005 |
|----|-----------|--------|
| JP | 2003177241 A | 6/2003 |

(Continued)

OTHER PUBLICATIONS

Translation of JP 2003-177241. See IDS filed Dec. 8, 2014 for date and inventor.*
Translation of JP 2014-198745.*
Taiwanese Office Action dated Apr. 23, 2015.
International Search Report for PCT/KR2013/000112 dated Apr. 12, 2013.

*Primary Examiner* — Victor S Chang
(74) *Attorney, Agent, or Firm* — Lerner, David, Littenberg, Krumholz & Mentlik, LLP

(57) ABSTRACT

The present invention relates to an optical adhesive film which has excellent adhesive strength at room temperature and has improved efficiency in a rework process since peel strength is low at high temperatures. When attaching a touchscreen panel and an LCD by using the adhesive film of the present invention and separating the touchscreen panel and the LCD at high temperatures, the touchscreen panel and the LCD can be separated from each other without causing damage thereto. Additionally, the optical film of the present invention comprises two adhesive layers, wherein peeling occurs at the first adhesive layer having an adhesive composition such that a peeling surface can be controlled according to the convenience of a user.

11 Claims, 1 Drawing Sheet

(51) Int. Cl.
*C09J 133/04* (2006.01)
*C09J 7/00* (2006.01)
*C09J 7/02* (2006.01)
*G02B 27/00* (2006.01)

(52) U.S. Cl.
CPC ..... *C08L 2312/00* (2013.01); *C09J 2201/134* (2013.01); *C09J 2201/36* (2013.01); *C09J 2201/622* (2013.01); *C09J 2203/318* (2013.01); *C09J 2433/00* (2013.01); *G02B 27/0018* (2013.01); *Y10T 428/24942* (2015.01)

(56) References Cited

FOREIGN PATENT DOCUMENTS

| | | | |
|---|---|---|---|
| JP | 2009132876 | A | 6/2009 |
| JP | 2011-57883 | A | 3/2011 |
| JP | 2011074308 | A | 4/2011 |
| JP | 5008870 | B2 | 8/2012 |
| JP | 5543101 | B2 | 7/2014 |
| JP | 2014198745 | A * | 10/2014 |
| KR | 20040030187 | A | 4/2004 |
| KR | 20050026869 | A | 3/2005 |
| KR | 20120055454 | A | 5/2012 |
| TW | 200303911 | A | 9/2003 |
| WO | 2011/105874 | A2 | 9/2011 |

\* cited by examiner

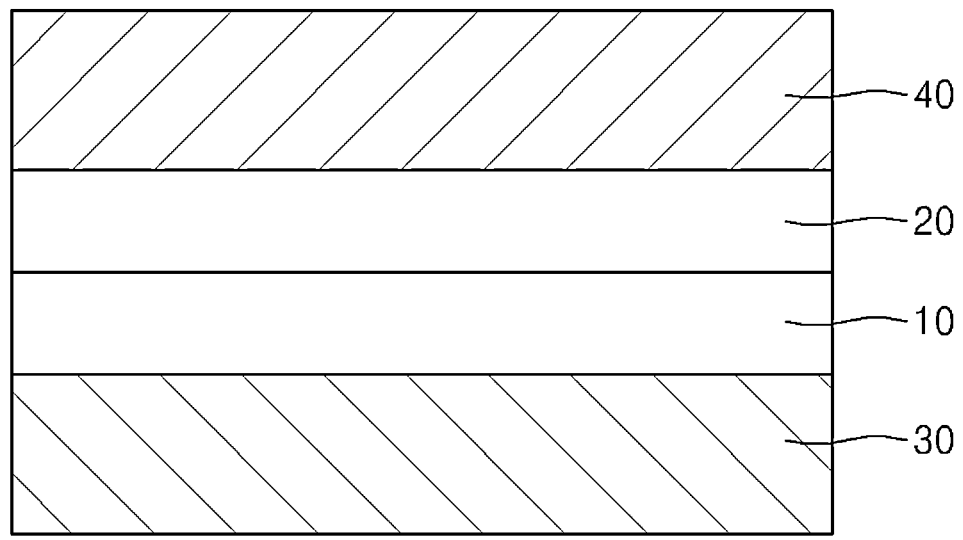

US 9,850,408 B2

OPTICAL ADHESIVE FILM HAVING EXCELLENT PEELING EFFECT AT HIGH TEMPERATURES

CROSS REFERENCE TO RELATED APPLICATION

This application claims the priority of Korean Patent Application No. 10-2012-0063064 filed on Jun. 13, 2012 in the Korean Patent and Trademark Office. Further, this application is the National Phase application of International Application No. PCT/KR2013/000112 filed on Jan. 8, 2013, which is incorporated herein by reference in its entirety.

TECHNICAL FIELD

The present invention relates to an optical adhesive film exhibiting excellent high temperature peelability and a touch panel using the same.

BACKGROUND ART

Smart phones, tablet PCs and the like have an air gap between a touchscreen and an LCD, and suffer from deterioration in visibility outdoors due to diffuse reflection of light caused by this air gap. Therefore, deterioration in outdoor visibility is generally overcome by filling the air gap with an optical adhesive film.

However, defective products are often produced after a touchscreen panel is attached to an LCD using the optical adhesive film. In this case, the defective products are collected and subjected to a rework process. Here, it is not easy to separate the touchscreen panel from the LCD since the attached adhesive film is not easily removed, and even though separated, the touchscreen panel and the LCD are damaged during separation in many cases.

Therefore, there is a need for an adhesive film which exhibits excellent peelability upon applying the adhesive film to a rework process while exhibiting excellent adhesion.

DISCLOSURE

Technical Problem

It is an aspect of the present invention to provide an optical adhesive film including an adhesive layer formed of an adhesive composition which exhibits low adhesive strength at high temperature while exhibiting excellent adhesive strength at room temperature.

Technical Solution

In accordance with one aspect of the present invention, an optical adhesive film includes: a first adhesive layer formed of an acrylic adhesive composition; and a second adhesive layer disposed on an upper side of the first adhesive layer and formed of an adhesive composition exhibiting higher adhesive strength than the adhesive composition forming the first adhesive layer.

In accordance with another aspect of the present invention, a touch panel includes the optical adhesive film as set forth above.

Advantageous Effects

According to the present invention, since adhesion of the adhesive composition applied to the adhesive film is controlled depending upon temperature, the adhesive composition exhibits high adhesive strength at room temperature, whereas the adhesive composition exhibits low adhesive strength at high temperature. In addition, when an LCD is attached to a touchscreen panel using the adhesive film according to the present invention, the touchscreen panel and the LCD can be separated without damage upon separation at high temperature.

Further, since the optical film according to the present invention includes two adhesive layers and peeling-off occurs in the first adhesive layer formed of the adhesive composition, there is an advantage in that a peeling surface can be controlled according to user convenience.

DESCRIPTION OF DRAWINGS

FIG. 1 shows an adhesive film according to one embodiment of the present invention.

LIST OF REFERENCE NUMERALS

10: first adhesive layer
20: second adhesive layer
30: first peeling liner
40: second peeling liner

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof. Like components will be denoted by like reference numerals throughout the specification.

Hereinafter, embodiments of the present invention will be described in detail with reference to the accompanying drawings.

(1) Adhesive Composition Forming First Adhesive Layer

1) First Acrylic Polymer

According to the present invention, a monomer used for a first acrylic polymer may include butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, and mixtures thereof. The first acrylic polymer preferably includes 2-ethylhexyl acrylate or isooctyl acrylate as the monomer in view of adhesion control. The first acrylic polymer may be poly(2-ethylhexyl acrylate) in consideration of economic efficiency. According to the present invention, poly(2-ethylhexyl acrylate) has a molecular weight (Mw) from 500,000 to 2,000,000, and a glass transition temperature (Tg) from $-50°$ C. to $-70°$ C.

2) Second Acrylic Polymer

According to the present invention, a second acrylic polymer acts as a functional group when an adhesive is bonded to an adherend. According to the present invention, the second acrylic polymer may include acrylic acid as a monomer. The second acrylic polymer is present in an amount of 2 parts by weight to 25 parts by weight based on 100 parts by weight of the first acrylic polymer. If the second acrylic polymer is present in an amount of less than 2 parts by weight or is not present, the adhesive composition exhibits deterioration in peel strength and cuttability due to generation of adhesive residues upon cutting. On the other hand, if the amount of the second acrylic polymer is greater than 25 parts by weight, although the adhesive composition has improved cuttability, the adhesive composition exhibits deterioration in adhesion to an adherend due to curing of the adhesive.

Preferably, the second acrylic polymer is a polyacrylate. According to the present invention, the polyacrylate has a molecular weight (Mw) from 50 to 200, and a glass transition temperature (Tg) from 95° C. to 115° C.

3) Amide Bond-Containing Compound

According to the present invention, an amide bond-containing compound includes an amide bond. Although the adhesive composition has high peel strength at room temperature, the adhesive composition exhibits low peel strength at high temperature due to high mobility and soft properties at high temperature. The amide bond-containing compound may have a molecular weight from 80 to 160. The amide bond-containing compound is present in an amount of 0.1 parts by weight to 10 parts by weight based on 100 parts by weight of the first acrylic polymer. If the amide bond-containing compound is present in an amount of less than 0.1 parts by weight or is not present, a specimen cannot be properly formed due to deterioration in chemical bonding force and the adhesive composition suffers from severe generation of adhesive residues upon cutting. If the amount of the amide bond-containing compound is greater than 10 parts by weight, the adhesive composition becomes too hard and thus can exhibit deterioration in peel strength at room temperature and low usability.

The amide bond-containing compound is N-vinylpyrrolidone, acryloyl morpholine, or dimethyl acrylamide, preferably acryloyl morpholine.

4) Coupling Agent

According to the present invention, any coupling agent, which is typically used for an adhesive composition using an acrylic resin, may be used without limitation. For example, the coupling agent according to the present invention may include silicone coupling agents, and the like. For example, the coupling agent may include γ-glycidoxypropyltrimethoxy silane, γ-glycidoxypropylmethyldiethoxy silane, γ-glycidoxypropyltriethoxy silane, 3-mercaptopropyltrimethoxy silane, vinyltrimethoxy silane, vinyltriethoxy silane, γ-methacryloxypropyltrimethoxy silane, γ-methacryloxypropyltriethoxy silane, γ-aminopropyltrimethoxy silane, γ-aminopropyltriethoxy silane, 3-isocyanatepropyltriethoxy silane, γ-acetoacetatepropyltrimethoxy silane, and the like. These coupling agents may be used alone or in combination thereof.

According to the present invention, the coupling agent is present in an amount of 0.01 parts by weight to 3.0 parts by weight based on 100 parts by weight of the first acrylic polymer. If the amount of the coupling agent is less than 0.01 parts by weight, coupling might not sufficiently occur, and if the amount of the coupling agent is greater than 3.0 parts by weight, unreacted coupling agent can remain as an impurity.

5) Photoinitiator

According to the present invention, any photoinitiator may be used without limitation so long as the photoinitiator can generate radicals by light irradiation and thus initiate polymerization. Specifically, the photoinitiator may include benzoin initiators, hydroxyketone initiators, aminoketone initiators, and the like. More specifically, the photoinitiator may include benzoin, benzoin methyl ether, benzoin ethyl ether, benzoin isopropyl ether, benzoin n-butyl ether, benzoin isobutyl ether, acetophenone, dimethylamino acetophenone, α,α-methoxy-α-hydroxyacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxyl)phenyl-2-(hydroxy-2-propyl)ketone, benzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, oligo[2-hydroxy-2-methyl-1-[4-(1-methylvinyl)phenyl]propanone], and the like, without being limited thereto. These photoinitiators may be used alone or in combination thereof.

As used herein, the term "light irradiation" refers to electromagnetic wave irradiation which can have an influence on photoinitiators or polymerizable compounds and thus cause polymerization, and electromagnetic wave is used as a generic term for particle beams, such as α-particle beams, proton beams, neutron beams, and electron beams, as well as microwaves, infrared rays, ultraviolet rays, X-rays and γ-rays.

According to the present invention, the photoinitiator may be present in an amount of 0.01 parts by weight to 3.0 parts by weight based on 100 parts by weight of the first acrylic polymer. If the amount of the photoinitiator is less than 0.01 parts by weight, the adhesive composition can suffer from increased reaction time or significantly deteriorated reactivity. Conversely, if the amount of the photoinitiator is greater than 3.0 parts by weight, unreacted photoinitiator can remain as an impurity.

6) Curing Agent

According to the present invention, a curing agent may include curing agents known in the art, such as polyfunctional phenols, amines, imidazole compounds, acid anhydrides, organophosphorus compounds and halides thereof, polyfunctional acrylics, urethanes, isocyanates, alcohols, polyamides, polysulfides, boron trifluoride, and the like, without being limited thereto.

According to the present invention, the curing agent may be present in an amount of 0.01 parts by weight to 7.0 parts by weight based on 100 parts by weight of the first acrylic polymer. If the amount of the curing agent is less than 0.01 parts by weight, the adhesive composition can suffer from increased curing time or insufficient curing. Conversely, if the amount of the curing agent is greater than 7.0 parts by weight, unreacted curing agent can remain as an impurity, or the adhesive composition can become overly rigid and thus exhibit deteriorated usability.

(2) Adhesion (Peel Strength) of Adhesive Composition

The adhesive composition according to the present invention exhibits considerably low adhesive strength at high temperature while exhibiting considerably high adhesive strength at room temperature. According to the present invention, the adhesive composition has an adhesive strength from 2000 g/M to 3500 g/M as measured at room temperature (25° C.) in accordance with ASTM D3330 modified. If the adhesive strength of the adhesive composition at room temperature is less than 2000 g/M, an adhesive layer applied to products can be detached upon impact, for example, when dropped, and thus it is difficult to apply the adhesive composition to the products. In addition, the adhesive composition according to the present invention has an adhesive strength of 500 g/M or less, preferably from 100 g/M to 500 g/M, more preferably from 300 g/in to 500 g/M, as measured at 100° C. If the adhesive strength of the adhesive composition at 100° C. is greater than 500 g/M, it is not easy to re-peel off the adhesive composition upon rework.

A difference between adhesive strength at 100° C. and adhesive strength at 25° C. of the adhesive composition is from 1000 g/M to 3000 g/M, preferably from 1500 g/M to 3000 g/M, more preferably from 1800 g/M to 3000 g/M, as measured in accordance with ASTM D3330 modified.

The adhesive composition has a shear strength at room temperature (25° C.) from 500 N/in$^2$ to 1500 N/in$^2$, preferably from 800 N/in$^2$ to 1000 N/in$^2$, and a shear strength at 100° C. from 5 N/in$^2$ to 200 N/in$^2$, preferably from 10 N/in$^2$ to 100 N/in$^2$. In addition, the adhesive composition may have a molecular weight (Mw) from 300,000 to 2,500,000.

(3) Adhesive Film

According to one embodiment of the present invention, an optical adhesive film includes a first adhesive layer 10 formed of the adhesive composition as set forth above; a second adhesive composition 20 formed of an adhesive composition exhibiting higher adhesive strength than the first adhesive layer; and release liners 30, 40 disposed on a lower side of the first adhesive layer and an upper side of the second adhesive layer, respectively (FIG. 1).

The first adhesive layer is formed by coating the adhesive composition onto a first release liner, followed by curing. Next, the second adhesive layer is formed by coating the adhesive composition exhibiting higher adhesive strength onto an upper side of the first adhesive layer, followed by curing. Next, a second release liner is laminated on the second adhesive layer, thereby manufacturing an adhesive film.

The composition forming the second adhesive layer has higher adhesive strength than the adhesive composition forming the first adhesive layer. More specifically, the composition forming the second adhesive layer has an adhesive strength at 100° C. from 1000 g/in to 5000 g/in, preferably from 2000 g/in to 4000 g/in. Since the second adhesive layer has higher adhesive strength than the first adhesive layer and thus exhibits low peel strength, peeling-off occurs from the first adhesive layer.

Although the composition forming the second adhesive layer can be easily prepared by any method known in the art so as to exhibit limited adhesive strength, the composition may include an acrylic polymer, a coupling agent, a photoinitiator, and a curing agent.

Specifically, the adhesive composition forming the second adhesive layer may include a polymer, in which 2-ethylhexyl acrylate (2-EHA) is a monomer, as the first acrylic polymer, and may include 1 part by weight to 30 parts by weight of a polymer, in which acrylic acid is a monomer, as the second acrylic polymer based on 100 parts by weight of the first acrylic polymer. In addition, the adhesive composition forming the second adhesive layer may include 0.01 parts by weight to 3.0 parts by weight of the coupling agent, 0.01 parts by weight to 3.0 parts by weight of the photoinitiator, and 0.01 parts by weight to 7.0 parts by weight of the curing agent. Unlike the adhesive composition forming the first adhesive layer, the adhesive composition forming the second adhesive layer may not include an amide bond-containing compound.

The release liners 30, 40 have different release forces and may have a release force from 5 g/in to 120 g/in. If the release force of the release liners is less than 5 g/in, the adhesive film can suffer from a tunneling phenomenon upon processing, and if the release force of the release liners is greater than 120 g/in, the adhesive film can suffer from deterioration in processability due to difficulty in peeling-off.

As such, when the adhesive film has a bilayer structure of the first and second adhesive layers, there is an advantage in that a peeling surface of the adhesive film can be controlled according to user convenience as compared with an adhesive film formed in a single layer. In addition, the adhesive film can be advantageously subjected to processes in terms of economic efficiency due to the simplified structure thereof as compared with an adhesive film including a multilayer structure, and can maintain excellent optical properties thereof due to exclusion of an intermediate PET layer and the like.

(4) Electronic Apparatus

According to the present invention, the adhesive film can be applied to general electronic apparatuses including a touchscreen panel and an LCD. For example, the electronic apparatuses may include smartphones, tablet PCs, and the like.

1. Preparation of Adhesive Composition Forming First Adhesive Layer

Components were prepared in amounts as listed in Table 1, followed by mixing 0.5 parts by weight of a coupling agent, 0.5 parts by weight of Irgacure 651 (Ciba Specialty Chemicals Co., Ltd.) and 1.0 part by weight of toluene diisocyanate with the components, thereby preparing an adhesive composition. Next, the adhesive composition was bar-coated onto a 100 μm thick PET web, and cured by UV irradiation for 3 minutes (Examples 1 to 10, Comparative Examples 1 to 5).

TABLE 1

| | | Component | | | | |
|---|---|---|---|---|---|---|
| | | Poly(2-ethylhexyl acrylate) | Poly(isooctyl acrylate) | Polyacrylate | Acryloyl morpholine | N-vinylpyrrolidone |
| Example | 1 | To 100 | — | 2 | 3 | — |
| | 2 | To 100 | — | 10 | 3 | — |
| | 3 | To 100 | — | 25 | 3 | — |
| | 4 | To 100 | — | 10 | 0.5 | — |
| | 5 | To 100 | — | 10 | 10 | — |
| | 6 | — | To 100 | 2 | — | 3 |
| | 7 | — | To 100 | 10 | — | 3 |
| | 8 | — | To 100 | 25 | — | 3 |
| | 9 | — | To 100 | 10 | — | 0.5 |
| | 10 | — | To 100 | 10 | — | 10 |

TABLE 1-continued

| | | Poly(2-ethylhexyl acrylate) | Poly(isooctyl acrylate) | Polyacrylate | Acryloyl morpholine | N-vinylpyrrolidone |
|---|---|---|---|---|---|---|
| Comparative Example | 1 | To 100 | — | 30 | 3 | — |
| | 2 | To 100 | — | 10 | 15 | — |
| | 3 | To 100 | — | — | 3 | — |
| | 4 | To 100 | — | 25 | — | — |
| | 5 | To 100 | — | — | 10 | — |

In addition, 100 parts by weight of poly(2-ethylhexyl acrylate), 10 parts by weight of polyacrylic acid, 0.5 parts by weight of a coupling agent, 0.5 parts by weight of a photoinitiator and 1.0 part by weight of a curing agent were mixed, thereby preparing a second adhesive composition.

2. Property Evaluation of Adhesive Film

EXPERIMENTAL EXAMPLE 1

Evaluation of Adhesion (Peel Strength) of First Adhesive Composition Depending Upon Temperature Each of the adhesive compositions of Examples 1 to 10 and Comparative Examples 1 to 5 was evaluated as to adhesion (peel strength) depending upon temperature. Evaluation of adhesion was performed in accordance with ASTM D3330 modified using a 50 μm thick PET film (SG00, SKC Co., Ltd.) as a backing film after storage of the adhesive composition in an oven at 100° C. for 5 minutes as high temperature conditions.

As a result, it was confirmed that the adhesive compositions of Examples 1 to 10 exhibited low adhesive strength at high temperature while exhibiting considerably high adhesive strength at room temperature (25° C.). However, it could be seen that although the adhesive compositions of Comparative Examples 1 to 5 exhibited sufficiently low adhesive strength at high temperature, it would be difficult to apply the adhesive compositions of Comparative Examples 1 to 5 to products due to overly low adhesion thereof at room temperature. In particular, it could be seen that the adhesive composition of Comparative Example 3, which did not include a polyacrylate, exhibited overly low peel strength at room temperature due to lack of functional groups, and the adhesive compositions of Comparative Examples 1 and 2, which included an excess of the polyacrylate or acryloyl morpholine, were too hard and thus were not properly bonded to an adherend.

TABLE 2

| | | Adhesive strength (g/in) | |
|---|---|---|---|
| | | Room temperature | High temperature (100° C.) |
| Example | 1 | 2250 | 360 |
| | 2 | 2780 | 410 |
| | 3 | 2100 | 420 |
| | 4 | 2570 | 390 |
| | 5 | 3240 | 410 |
| | 6 | 2340 | 400 |
| | 7 | 2890 | 420 |
| | 8 | 2200 | 420 |
| | 9 | 2600 | 400 |
| | 10 | 3210 | 420 |
| Comparative Example | 1 | 880 | 230 |
| | 2 | 1100 | 140 |
| | 3 | 1300 | 180 |
| | 4 | 1400 | 620 |
| | 5 | 1500 | 310 |

Adhesive strength of the second adhesive composition at high temperature was measured in the same manner as described above. As a result, it was confirmed that the second adhesive composition had an adhesive strength of 1300 g/M.

EXPERIMENTAL EXAMPLE 2

Evaluation of Optical Properties

For use as an optical adhesive, an adhesive composition must have a transmittance of 97% or more and a haze of 1.0% or less. Therefore, total transmittance and haze were measured on each of the adhesive compositions of Examples 1 to 10 and Comparative Examples 1 to 5 to evaluate optical properties thereof. Total transmittance and haze were measured in accordance with ASTM D 1003 modified.

Total transmittance refers to total transmittance of light including collimated light components and scattered light components of incident light. According to the present invention, total transmittance was measured after a transparent film was attached to a glass plate, and was represented by Expression 1 as correction data on the basis of 100% after a baseline was set to the glass plate. Haze was measured on an OCA alone using a HR-100 haze meter.

$$(\text{Glass/OCA transmittance})/\text{Glass transmittance} * 100\% \qquad [\text{Expression 1}]$$

As a result, it was confirmed that the adhesive compositions of Examples 1 to 10 exhibited suitable optical properties as an OCA film (Table 3).

TABLE 3

| | | Total transmittance | Haze (%) |
|---|---|---|---|
| Example | 1 | 99 | 0.5 |
| | 2 | 99 | 0.5 |
| | 3 | 99 | 0.5 |
| | 4 | 99 | 0.5 |
| | 5 | 99 | 0.7 |
| | 6 | 99 | 0.5 |
| | 7 | 99 | 0.5 |
| | 8 | 99 | 0.5 |
| | 9 | 99 | 0.5 |
| | 10 | 99 | 0.7 |

TABLE 3-continued

|  |  | Total transmittance | Haze (%) |
|---|---|---|---|
| Comparative Example | 1 | 98 | 1.2 |
|  | 2 | 95 | 1.8 |
|  | 3 | 99 | 0.5 |
|  | 4 | 98 | 0.5 |
|  | 5 | 98 | 1.2 |

EXPERIMENTAL EXAMPLE 3

Evaluation of Durability

Each of the adhesive films of Examples 1 to 10 and Comparative Examples 1 to 5 was evaluated as to durability at high temperature and high humidity. Specifically, each of the transparent adhesive films was coated onto a glass plate, followed by lamination of an ITO film (Hansung Co., Ltd., 188 μm thick) on the adhesive film. Next, the adhesive film was left at the above temperature/humidity conditions for a certain period of time (240 hr), and observed to evaluate durability.

As a result, it was confirmed that the adhesive films of Examples 1 to 10 exhibited sufficient durability at high temperature and high humidity. However, it was observed that all of the adhesive films of Comparative Examples suffered from detachment although there was a slight difference therebetween (Table 4).

TABLE 4

|  |  | 60° C., 90%, 40 hr | 85° C., 85%, 240 hr |
|---|---|---|---|
| Example | 1 | Good | Good |
|  | 2 | Good | Good |
|  | 3 | Good | Good |
|  | 4 | Good | Good |
|  | 5 | Good | Good |
|  | 6 | Good | Good |
|  | 7 | Good | Good |
|  | 8 | Good | Good |
|  | 9 | Good | Good |
|  | 10 | Good | Good |
| Comparative Example | 1 | Detachment | Detachment |
|  | 2 | Good | Detachment |
|  | 3 | Detachment | Detachment |
|  | 4 | Good | Detachment |
|  | 5 | Detachment | Detachment |

The invention claimed is:

1. An optical adhesive film comprising:
   a first adhesive layer formed by curing an acrylic adhesive composition; and
   a second adhesive layer disposed on an upper side of the first adhesive layer and formed by curing an adhesive composition exhibiting higher adhesive strength than the acrylic adhesive composition forming the first adhesive layer,
   wherein the acrylic adhesive composition forming the first adhesive layer comprises a first acrylic polymer, a second acrylic polymer, an amide bond-containing compound, and a curing agent,
   wherein the amide bond-containing compound is present in an amount of 0.5 parts by weight to 10 parts by weight based on 100 parts by weight of the first acrylic polymer, and
   wherein the adhesive composition forming the second adhesive layer does not comprise the amide bond-containing compound.

2. The optical adhesive film according to claim 1, wherein a difference between adhesive strength at 100° C. and adhesive strength at 25° C. of the acrylic adhesive composition forming the first adhesive layer ranges from 1000 g/in to 3000 g/in, as measured in accordance with ASTM D3330 modified.

3. The optical adhesive film according to claim 1, wherein the first acrylic polymer comprises 2-ethylhexyl acrylate or isooctyl acrylate as a monomer.

4. The optical adhesive film according to claim 1, wherein the second acrylic polymer comprises acrylic acid as a monomer and is present in an amount of 2 parts by weight to 25 parts by weight based on 100 parts by weight of the first acrylic polymer.

5. The optical adhesive film according to claim 1, wherein the amide bond-containing compound has a molecular weight from 80 to 160.

6. The optical adhesive film according to claim 1, wherein the adhesive composition forming the first adhesive layer further comprises a coupling agent and a photoinitiator.

7. The optical adhesive film according to claim 1, wherein the adhesive composition forming the first adhesive layer has an adhesive strength at 100° C. from 100 g/in to 500 g/in.

8. The optical adhesive film according to claim 1, wherein the adhesive composition forming the second adhesive layer has an adhesive strength at 100° C. from 1000 g/in to 5000 g/in.

9. The optical adhesive film according to claim 1, wherein the adhesive composition forming the second adhesive layer comprises an acrylic polymer, a coupling agent, a photo initiator, and a curing agent.

10. The optical adhesive film according to claim 1, comprising:
    release liners disposed on a lower side of the first adhesive layer and an upper side of the second adhesive layer, respectively.

11. A touch panel comprising the optical adhesive film according to claim 1.

* * * * *